United States Patent
Morettin

[11] Patent Number: 5,958,099
[45] Date of Patent: Sep. 28, 1999

[54] GLASS MAKING PROCESS USING BLANK MOLD SOOTING

[75] Inventor: Ambrogio Morettin, Cinto Cao Maggiore, Italy

[73] Assignee: Avir Finanziaria S.p.A., Asti, Italy

[21] Appl. No.: 09/018,314

[22] Filed: Feb. 3, 1998

Related U.S. Application Data

[62] Division of application No. 08/688,722, Jul. 31, 1996, Pat. No. 5,746,800, which is a continuation of application No. 08/207,704, Mar. 9, 1994, abandoned.

[30] Foreign Application Priority Data

Oct. 11, 1993 [IT] Italy .................................. PN93A0065

[51] Int. Cl.[6] .................. C03B 40/00; C03B 9/00
[52] U.S. Cl. .................. 65/26; 65/68; 65/169; 65/170; 427/577; 427/580; 427/450; 427/249
[58] Field of Search .................. 65/26, 29.1, 169, 65/170, 301, 68, 72, 214, 215, 219, 229, 82, 79, 160, 300, 323, 261, 262; 425/90, 96, 98; 249/114.1, 115; 427/577, 450, 580, 249

[56] References Cited

U.S. PATENT DOCUMENTS

| | | | |
|---|---|---|---|
| 1,535,149 | 4/1925 | Dostal | 118/47 |
| 3,141,752 | 7/1964 | Keller . | |
| 3,480,422 | 11/1969 | Lichok et al. | 65/169 |
| 3,981,711 | 9/1976 | Bjorkstrom | 65/26 |
| 4,402,721 | 9/1983 | Ericson et al. | 65/163 |
| 4,412,974 | 11/1983 | Nicolas et al. | 422/156 |
| 4,498,918 | 2/1985 | Seeman | 65/26 |
| 4,578,099 | 3/1986 | Hübner et al. | 65/169 |
| 4,648,893 | 3/1987 | Roux . | |
| 4,806,137 | 2/1989 | Virey . | |
| 5,120,341 | 6/1992 | Nozawa et al. | 65/26 |

FOREIGN PATENT DOCUMENTS

| | | |
|---|---|---|
| 903244 | 1/1986 | Belgium . |
| 0 022 385 | 1/1981 | European Pat. Off. . |
| 0 125 477 A1 | 11/1984 | European Pat. Off. . |
| 0 238 403 | 9/1987 | European Pat. Off. . |
| 0 368 267 A1 | 5/1990 | European Pat. Off. . |
| 0 393 554 | 10/1990 | European Pat. Off. . |
| 0 443 794 A1 | 8/1991 | European Pat. Off. . |
| 0 647 599 A1 | 4/1995 | European Pat. Off. . |
| 60-56756 | 12/1985 | Japan . |
| 61-72632 | 4/1986 | Japan . |
| 64-26344 | 2/1989 | Japan . |
| 2-295634 | 12/1990 | Japan . |
| 4-139032 | 5/1992 | Japan . |

*Primary Examiner*—Steven P. Griffin
*Attorney, Agent, or Firm*—Oblon, Spivak, McClelland, Maier & Neustadt, P.C.

[57] ABSTRACT

A blank mold sooting process in which a lubricating or detaching layer is formed on the internal walls of the blank mold, by igniting an acetylene flow with piezoelectric electrodes, a voltaic arc generator, or an electrical resistance. The process is performed utilizing, for example, a blow mold and an invert, and the invert can be utilized to transfer a collar from the blank mold to the blow mold.

12 Claims, 3 Drawing Sheets

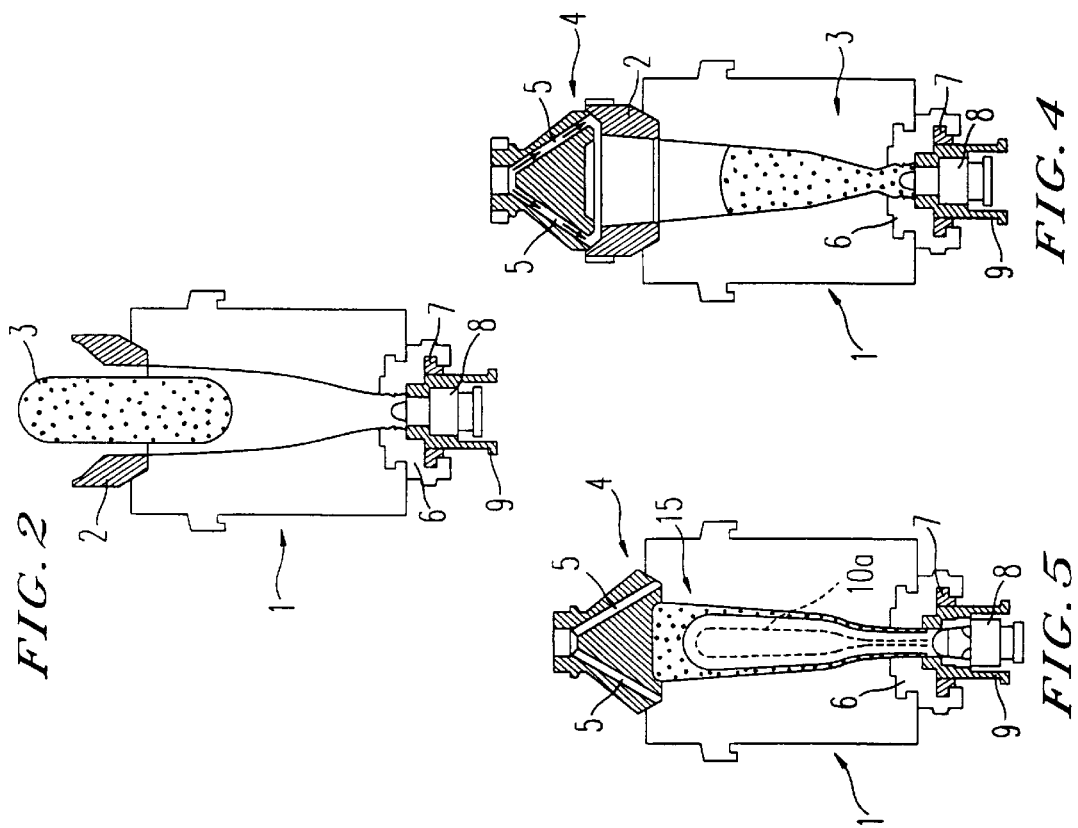
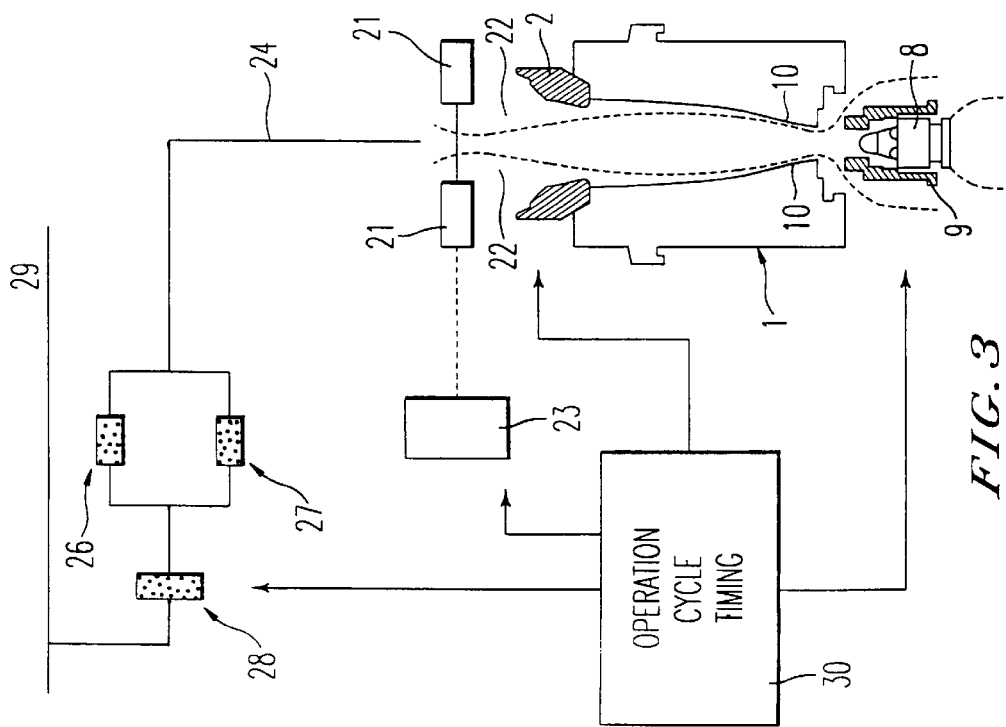

GLASS MAKING PROCESS USING BLANK MOLD SOOTING

This is a divisional of application Ser. No. 08/688,722, filed Jul. 31, 1999, now U.S. Pat. No. 5,746,800, which is a continuation of application Ser. No. 08/207,704, filed Mar. 9, 1994, now abandoned.

FIELD OF THE INVENTION

The present invention relates to an automatic blank-mold sooting device for use in the glass making industry. The blank-mold sooting device is adapted to deposit a lubricating/detaching layer on the internal walls of the mold. The deposit is substantially made of carbon black, and the carbon black is obtained from an acetylene cracking process.

BACKGROUND OF THE INVENTION

It is well known that the high carbon content of acetylene and its property of exothermically decomposing into carbon and hydrogen make it an attractive raw material for conversion to carbon and that the carbon could represent a quite cheap and good lubricating material for some industrial requirements.

A problem, which has recurrently been encountered by hollow glassware making industries, concerns the necessity that a glass gob, which is injected into a blank mold, freely passes through the blank mold in such a way that its flow is not slackened by friction with the internal walls of the mold. It may also happen that a narrow portion of the glass gob meets with difficulties during the process of loading the glass gob into the blank mold, due to a partial gob adhesion to the walls of the mold. Consequently, the temperature distribution on internal mold walls becomes substantially irregular, whereby the blanked glassware becomes irregular, too. Indeed, as the blanked glassware is transferred to the blow mold, an air flow is injected thereinto (so that the glassware is formed into a definitive shape), and the air flow acts more intensively on the bottle portions which are hotter than the others. Furthermore, the hotter portions, which are more plastic than the cooler portions, are caused to get thinner than the cooler portions, with all the apparent drawbacks.

Till not long ago, a lubricating/detaching film on the internal mold walls was manually applied by means of a brush or similar device, by spreading a mixture of oil and graphite into the mold. However, each operator did not always follow the specifications relating to the amount of mixture as well as of the frequency of such an operation, with the result that a not uniform distribution of graphite made the blanked glass not regularly cooled. Consequently the glass gob was not freely loaded into the mold. In addition, the mold would rapidly get dirty from the graphite, whereby every 8–9 hours the operation cycle required a cleaning process. Moreover, the risk for the operator, regarding possible injuries during mold lubrication, can't be forgotten. Finally, the environment was polluted by oil combustion.

For these reasons, different technological solutions were sought for, particularly solutions involving the acetylene black process, since that process is adapted to deposit a lubricating/detaching layer of carbon black on the internal mold walls. A pilot flame is provided which is able to ignite the acetylene flow at a well defined moment of the operation cycle—not during every operation cycle, but just once every n cycles—according to the specifications of glassware to be obtained. In this way, the acetylene black process is able to coat the internal walls of blank molds. However, this solution has some drawbacks, too. Indeed:

heat produced by pilot flame heats the environment around the blank mold, whereby the operator is working in difficult conditions;

the pilot flame is fed by oxygen and methane, the cost of which is nearly equal to 60% of the overall energy costs of a hollow glass forming plant;

oxygen and methane, which feed the pilot flame, are able to oxidize acetylene, whereby the carbon black which coats the internal mold walls can lose its properties which are listed in the specifications;

some portions of the blank mold are oxidized instead of lubricated by the pilot flame feeder, whereby those portions could slacken the loading process of the gob into the blank mold; sometimes the blank mold supports are blocked, due to overheating produced by pilot flame; and, last but not least, the acetylene black process provides a collar in the bottom of the blank mold, which collar closes the bottom air-tightly, whereby the flame which is fed by acetylene is not allowed to reach the mold bottom, because it reverberates the flame, whereby not all the portions of the internal mold walls can be coated by a substantially uniform lubricating coat.

The problem which the device according to the invention intends to solve is mainly given by a solution, which allows acetylene black to arrive up to the bottom of the blank mold, in order to obtain a substantially uniform and complete coating of acetylene black on all the portions of the internal blank mold, whereby the glassware forming process can operate in a simple and correct way.

SUMMARY OF THE INVENTION

The problem is solved by a device according to the invention, which is characterized by plugging means (6, 7, 8, 9) of a bottom (10) of the blank mold (1). The plugging means (6, 7, 8, 9) is adapted to disengage the bottom (10) during a blank mold sooting process, whereby the lubricating/detaching layer can be deposited substantially on all portions of the blank mold internal walls, enabling a glass gob (3) to freely flow along the internal walls.

BRIEF DESCRIPTION OF THE DRAWINGS

These and other features will be apparent from the following description and from the drawings, wherein:

FIG. 2 represents a sectional view, taken according to the axial development of a blank mold, when a glass gob drops into the blank mold;

FIG. 3 represents the same view of FIG. 2, taken during a sooting process;

FIG. 4 represents the same view of FIGS. 2, 3, where a glass gob reaches the bottom of the blank mold;

FIG. 5 represents the same view of FIGS. 2, 3, 4 where a glass gob is pre-formed into a parison in a blank mold;

DETAILED DESCRIPTION OF THE PRESENTLY PREFERRED EMBODIMENTS

Figures 1, 9:
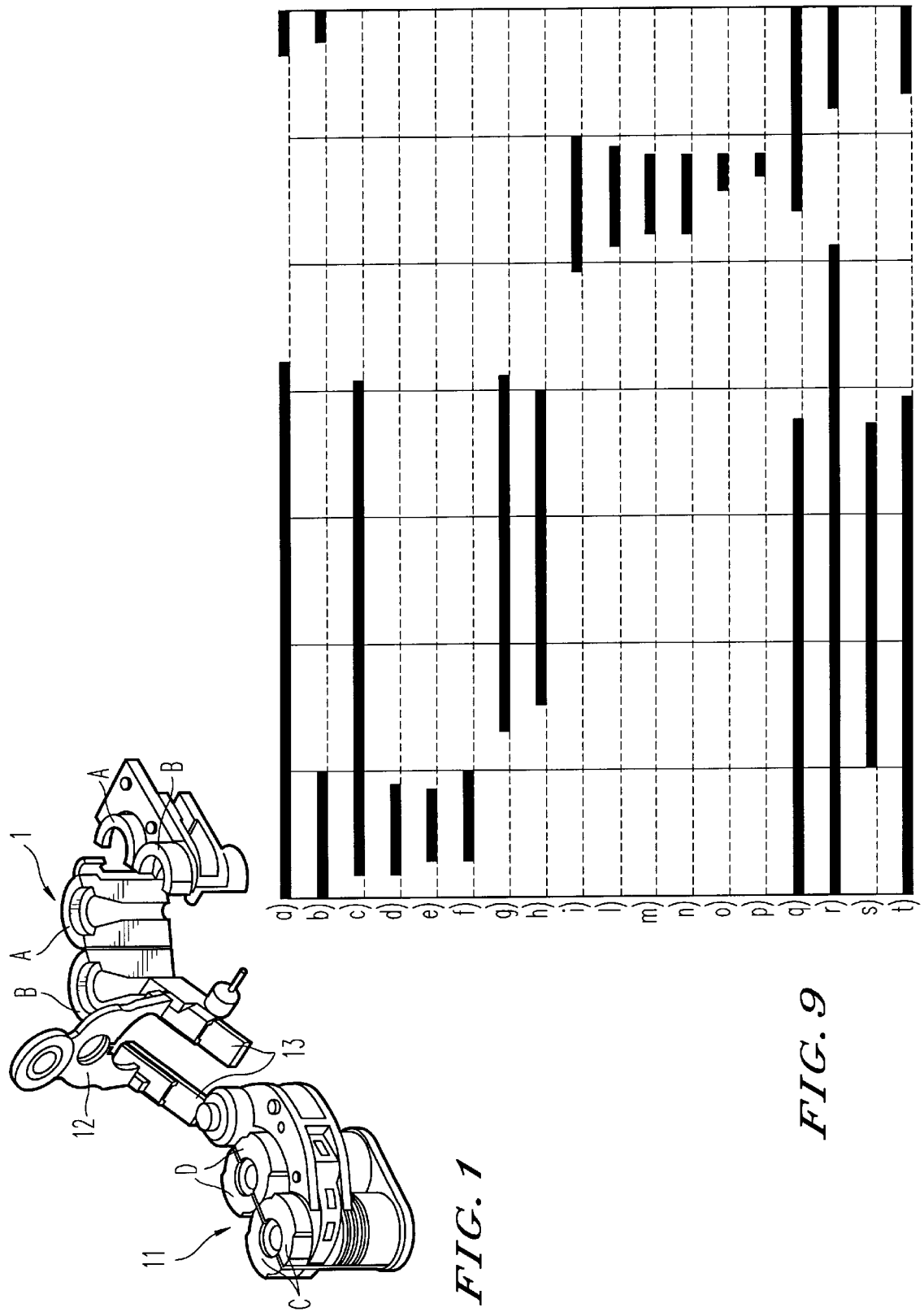
FIG. 1 represents a perspective schematic view of a hollow glassware forming plant.
FIG. 9 represents a synthetic table, which describes the sequence of the phases in an operation cycle of the device according to the invention.

The device according to the invention comprises a blank mold 1 (FIGS. 2, 3, 4, 5), which is represented in FIG. 1 as a two molds one-section machine, each one of the molds comprising two half portions, respectively A—A and B—B. The blank mold 1 has at its top a funnel 2 (FIGS. 2, 3, 4), which makes a glass gob 3 drop into the blank mold 1 (FIG. 2). As FIG. 1 shows, four mold portions A—A-,B—B are opened in the drawing, whereas they are closed during a running operation, as will be apparent later on.

A baffle 4 is provided on the funnel 2 (FIG. 4) or directly on the top of the blank mold 1 (FIG. 5), depending on which phase the running operation is working in. The baffle 4 internally contains some channels 5, through which air is blown into the blank mold 1, as will be explained later on.

A collar 6 is provided at the bottom of the blank mold 1 and, like the blank mold 1, it is made of two portions. Within a ring slit of the collar 6, a ring 7 is fitted, which is a single piece. The ring 7 presents a seat, inside which a plunger 8 is adapted to slide (FIGS. 2, 3, 4, 5).

A bottom 10 represents the lowest portion of the blank mold 1. The collar 6, the ring 7, and the plunger 8 represent means for plugging the bottom 10.

A sleeve 9 contains a hole in which the plunger 8 is adapted to slide. The sleeve 9, as will be apparent hereinafter, is adapted to follow a parison (i.e., a pre-formed glass) 15 which will be successively finished in a blow mold 11. The blow mold 11 is represented in FIG.1 in a position where two portions C—C-,D—D (which correspond to the two portion A—A-,B—B of blank mold 1) are closed.

The parison 15 is produced thanks to a so-called "counter-blow air", which is represented in FIG. 5 by a dashed line 10a. The counter-blow air is blown from the bottom 10 through an internal channel (not represented in the drawings) of the plunger 8.

The parison 15 is adapted to be transferred, as will be apparent later on, from the blank mold 1 to blow mold 11 by means of an invert, which is represented in FIG. 1 by an arm 12, connected to two supports 13.

Figure 8:
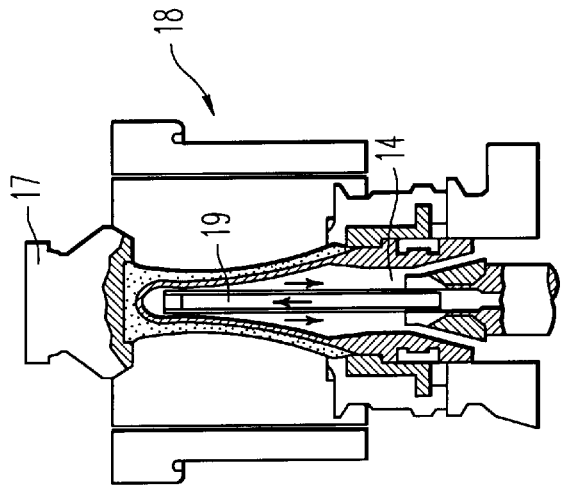
FIGS. 6, 7, 8 represent three following phases of a glass gob forming process in a blank mold, where a plunger and not an air blow pre-forms a glass gob into a parison.
Figure 7:
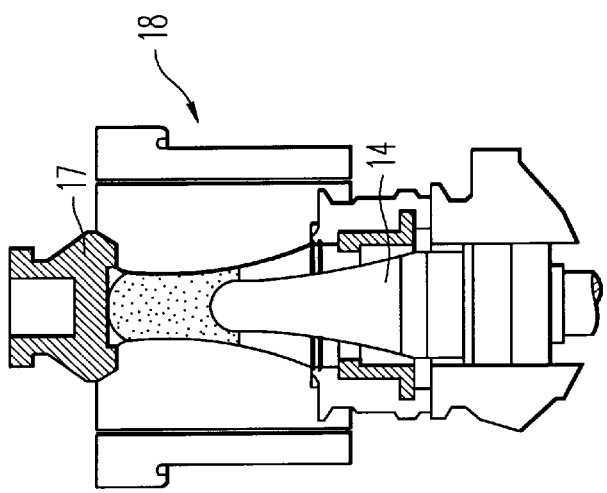
Figure 6:
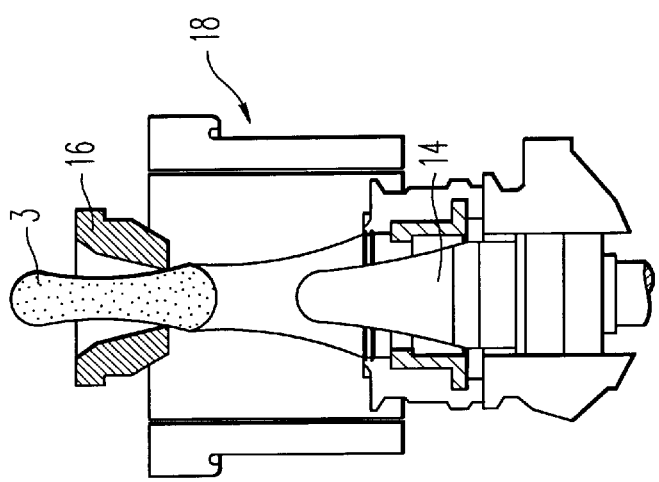

The plunger 8 of FIGS. 2, 3, 4, 5 can assume a shape of a plunger 14 of FIGS. 6, 7, 8 whenever the glass gob 3 is pre-formed, not by blown air, but by the action of the plunger 14.

FIG. 6 shows the presence of a funnel 16, which is similar to the funnel 2 of FIGS. 2, 3, whereas a baffle 17 plays the same role as the baffle 4 of FIGS. 4,5. The plunger 14 is adapted to assume at least three different positions: a lower position, as long as the glass gob 3 drops through the funnel 16 of a blank mold 18; an intermediate position, which corresponds to the running operation, when the baffle 17 matches to the blank mold 1, where the baffle 17 serves as a sealing device; and an upper position, where the glass gob 3 is formed into a definitive shape 19 by the plunger 14.

Above the funnel 2 of FIG. 3, a support 21 for two electrodes 22 is provided. The two electrodes 22 are controlled by a device 23. The device 23 is adapted, as it will be explained later on, to generate sparks, in a way known per se and at a definite time in the running operation cycle, between the electrodes 22. The sparks in turn cause a piezoelectric ignition of the fuel. The support 21, the electrodes 22, and the device 23 represent electrical ignition sparking means of device according to the invention.

It is apparent that ignition of the fuel could also be electrically obtained, in a way known per se, by means of a voltaic arc or of an electric resistance, not represented in the drawings.

The device 23 is controlled, in a way known per se, by operation cycle timing means as schematically represented at 30 in FIG. 3. The operation cycle timing means are, among other things, adapted to decide the choice of one active cycle every n operating cycles, depending on the plant type and on the glassware type to be manufactured.

Also, the positioning of the components 21, 22, 23, 24 on each blank mold 1, in correspondence of each process of sooting the blank mold 1, is committed to the operation cycle timing means.

The flow of acetylene is controlled by pressure modulation means, which are represented by a solenoid valve 26. Another solenoid valve 27 secures, as will be explained later on, full pressure acetylene feeding in a pipe 24. A valve 28 controls acetylene flow from a main pipe 29. The solenoid valve 26 is activated whenever an automatic blank mold sooting process is going to start, by throttling the main pipe 29 and allowing it to supply a reduced, at low pressure, acetylene flow. Substantially at the same moment (i.e., when acetylene flow is starting), the electrodes 22 are sparked, and, after a split second (preferably after approximately ¹⁄₁₀ sec.), the solenoid valve 27 intervenes, which is able to feed the pipe 24 at full pressure.

Each solenoid valve 26, 27 is connected to a tap, not represented in the drawings, for the manual control of the acetylene flow.

The operation cycle timing means are not only in charge of positioning the support 21, the electrodes 22, and the device 23 above each blank mold 1, but also of controlling the sparking of the electrodes 22 (FIG. 3) at the exact moment when the acetylene flow is starting. In addition, the operation cycle timing means are adapted to control the solenoid valves 26, 27, opening and closing of the blank mold 1, opening and closing of the blow mold 11, and operation of the invert (arm) 12.

As for the blank mold 1, the operation cycle timing means control the positioning of the funnel 2, the dropping of the glass gob 3 through the funnel 2, the positioning of the baffle 4 on the funnel 2, the intervening of the collar 6 and the ring 7, and the motion of the plunger 8 in the sleeve 9.

It should also be noted that the operation cycle timing means control the sequence of the phases in an operation cycle of device according to the invention. In order to better understand the sequence, all phases of the operation cycle are synthetically listed in the table of FIG. 9, in which the cycle is extended to an operation dimension of 360°. In detail:

a) line represents the blank mold 1 closing;

b) line represents the funnel 2 coming downwards;

c) line represents the sleeve 9 coming upwards;

d) line represents the plunger 8 coming upwards;

e) line represents the baffle 4 coming downwards;

f) line represents the air blowing pre-forming phase;

g) line represents the baffle 4 coming downwards;

h) line represents the counter-air blowing into the blank mold 1;

i) line represents the collar 6 inversion with the pre-formed parison;

l) line represents the second closing of the blank mold 1;

m) line represents the funnel 2 coming downwards;

n) line represents the active positioning of the sooting means;

o) line represents activation of the sooting means;

p) line represents steady feeding of the sooting means;

q) line represents closing of the blow mold 11;

r) line represents the revert phase of the arm 12;

s) line represents the final air blowing into the blow mold 11; and t) line represents bottle take-out from the blow mold 11.

The operation cycle of the device according to the invention starts immediately before the glass gob 3 drops into the blank mold 1. Exactly at this moment (equal to 0° of the running cycle), the two portions A—A and B—B (FIG. 1) close and the funnel 2 is positioned on the blank mold 1 top (FIG. 2). After a few degrees (i.e., after the glass gob 3 drops into the blank mold 1), the sleeve 9 is moved upwards in such a way that the plugging means (6, 7, 8, 9) are activated, closing the bottom 10. Therefore, when the glass gob 3 reaches the bottom 10, it can't leave it (FIG. 4).

Now, the operation cycle timing means controls, in a way known per se, the positioning of the baffle 4 on the funnel 2. Settle air is blown through the channels 5 of the baffle 4. All of this is for ensuring that the glass gob 3 reaches the bottom 10.

At approximately 60° of the operation cycle, the baffle 4 is removed, funnel 2 moves out, and the baffle 4 comes down again—this time covering the blank mold 1, where it serves as a sealing device (FIG. 5).

At approximately 75° degrees of the running cycle, counter-air is blown from the bottom 10, because, just a bit earlier (at 44° of the running cycle), the plunger 8 came down, so that counter-blow air 10a can pre-form the parison 15.

At approximately 200° of the running cycle, the sleeve 9 is moved down, the baffle 4 is removed, and the blank mold 1 is opened into two portions A—A and B—B, so that the parison 15 can be transferred to the blow mold 11. During the transfer operation, the collar 6 and the ring 7 join the parison 15. Consequently, the collar 6 and the ring 7 leave the bottom 10 in such a way that the plugging means are no longer active.

Immediately afterwards, the blank mold 1 closes again, and the funnel 2 is positioned on the blank mold 1, so that the sooting means can start working (if the n cycles, planned by the operation cycle timing means, have elapsed). Therefore, if a sooting cycle is planned, all proceeds as will explained later on. Otherwise, the operation cycle proceeds, and no sooting device is activated. However, a sooting cycle is, of course, planned in a subsequent operation cycle.

If a sooting cycle is planned, the blank mold 1 appears as in FIG. 3, in which the plunger 8 is lowered nearly one inch with respect to its blank mold plugging position. In addition, neither the collar 6 nor the ring 7 is present—because, as stated earlier, they had been transferred by the invert (arm) 12, and they are integral with the parison 15 at the blow mold 11. The automatic sooting device is, at first, positioned, in a way known per se, above each blank mold 1, together with the support 21, the electrodes 22, the device 23, and the pipe 24.

The device 23 controls the piezoelectric ignition of acetylene flow by means of the electrodes 22, the gap between which is such as to avoid disruption of the acetylene flow. For this purpose, the solenoid valve 26 allows, during a first period, a reduced acetylene flow through the pipe 24, in such a way that piezoelectric ignition is not perturbed by an initially too strong acetylene flow. However, immediately upon spark ignition, the solenoid valve 27 allows full flow feeding of the acetylene. Pick-up and drop-out of the solenoid valves 26,27 are controlled by the operation cycle timing means.

The acetylene flow involves, thanks to the piezoelectric ignition, all internal walls of the blank mold 1, particularly the bottom 10 of the blank mold 1, by depositing a lubricating/detaching layer. The deposit also involves the internal walls of the funnel 2, allowing the glass gob 3 to drop freely in a substantially correspondence to the blank mold center. In the prior art, in the case of the presence of a pilot flame, it could happen that the glass gob 3 could be slacked by oxides, which are produced by the same pilot flame and which are deposited on the internal walls of the funnel 2. However, in the device according to the invention, thanks to the lubrication of the walls of the funnel 2, the glass gob 3 drops into the blank mold 1, with no slackening in correspondence of the walls of the funnel 2, whereby an efficiency increase of the forming process can be obtained, as well as a better uniformity of the thickness of the manufactured hollow glassware.

In addition, as FIG. 3 shows, the flame, which is obtained thanks to acetylene cracking, involves the internal side walls of the blank mold 1 and, after reaching the bottom 10, leaves the blank mold 1 by flushing along the sleeve 9, both externally and internally. The plunger 8, which lowers about one inch with respect to its closed position (FIG. 4), allows this. Just before the piezoelectric sparking of the electrodes 22, the blow mold 11 closes, and then the revert phase is activated—i.e., reversal of the arm 12 to the blank mold 1 is actuated. Finally, the last blow into the blow mold 11 and the take-out of the formed bottle are operated.

If the blank mold 18 of FIGS. 6,7,8 is considered, the plunger 14 (and no counter-blow into the blank mold 1) produces pre-formed bottle. Everything proceeds as described in the previous phases, with the exception that no air blow from the top is provided, whereas air blow from the bottom (FIG. 8) has the substantial task of cooling the plunger 14, after manufacturing pre-formed glassware. The funnel 16 plays the same role as the funnel 2 in FIGS. 2,3, whereas the baffle 17, after positioning it on the blank mold 18, is not required to co-operate with the funnel 16, as opposed to what FIG. 4 shows, where the blank mold 1 operates with the funnel 2.

It is apparent that the acetylene black process operates for the blank mold 18 in the same way as for the blank mold 1 (FIG. 3). It is sufficient to imagine some redrafts to FIG. 6, where the glass gob 3 disappears, the plunger 14 lowers nearly one inch, and the sooting device, which comprises components 21, 22, 23, 24, 26, 27, 28, is positioned above the funnel 16. All the phases of the acetylene black process will be repeated also in this case, in a substantially similar way, as it was already described for the blank mold 1.

From the foregoing description of how the device and the method work, some considerations arise which should be pointed out. Indeed, with respect to well known plants, device according to the invention presents the following differential elements:

the sooting device operates as long as the plugging means is not operating—i.e., as long as the collar 6 and the ring 7 are absent, because they were previously transferred by the invert (arm) 12 towards the blow mold 11. In addition, the plunger 8 lowers with respect to its normal position during the sooting process. All these facts allow all the internal walls of the blank mold 1, and particularly the bottom 10, to be coated by acetylene black, as the flame and the sooting are not reverberated by plugging means. In such a way, plant efficiency and productivity can increase, as scraps, due to the miss-shaped glassware, are reduced to a minimum;

the acetylene black process, which is due to automatic sooting means, is interesting to be analyzed. With respect to well known plants, there is now no pilot flame, as ignition is due to piezoelectric sparking means (produced by the device 23) which are controlled by the timing means. As already stated, the piezoelectric solution of the sparking means could be substituted by a voltaic arc or on electrical resistance solution.

So, all drawbacks due to the presence of pilot flame are avoided, including drawbacks which are technical, economical, and connected to environment related conditions; particularly, a substantial reduction of costs of energy, which is consumed in a hollow glass forming plant, is obtained; in addition, production speed can be improved together with a decrease of bottle weight, thanks to its better thickness uniformity;

the gap between the electrodes 22 allows acetylene flow not to encounter any obstacle along its way, except the ignition spark produced by the electrodes 22. It is indeed an ignition of piezoelectric type, which substantially intervenes in the same moment, when acetylene starts flowing from the pipe 24. At first, acetylene is fed at a substantially reduced pressure with respect to a normal pressure, thanks to the solenoid valve 26, which controls a quite short initial bottleneck. In such a way, risk that the spark is not started immediately after acetylene flows from the pipe 24 is avoided. Then, starting from the moment when acetylene is fed at a normal pressure, the flame burns in a stable way. So, risk that the spark is not going to start immediately after acetylene flows from the pipe 24 at full pressure is avoided.

These and further advantages will be apparent from the description of the device according to the invention and from the appended claims. It should, however, be pointed out that the description is of the preferred embodiments, but the invention extends obviously to all embodiments, which are comprised in the field of invention, if they are substantially similar to the described operating devices.

I claim:

1. A blank mold sooting process for use on a glass making apparatus, said process comprising steps of:
    (a) depositing a lubricating/detaching layer:
        (i) on the internal walls of a blank mold which includes a first open end and a second open end at least substantially opposite the first open end
        (ii) by igniting an acetylene flow having a flow rate with piezoelectric electrodes, thereby producing a flame, and
    (b) directing the ignited acetylene flow such that the flame:
        (i) flows into the first open end of the blank mold,
        (ii) extends through the blank mold, and
        (iii) leaves the blank mold through the second open end.

2. A blank mold sooting process as recited in claim 1, wherein:
    (a) the glass making apparatus includes a collar, a blow mold, and an invert and
    (b) said process further comprises a step of employing the invert to transfer the collar from the blank mold to the blow mold.

3. A blank mold sooting process for use on a glass making apparatus, said process comprising steps of:
    (a) depositing a lubricating/detaching layer:
        (i) on the internal walls of a blank mold which includes a first open end and a second open end at least substantially opposite the first open end
        (ii) by igniting an acetylene flow having a flow rate with a voltaic arc generator, thereby producing a flame, and
    (b) directing the ignited acetylene flow such that the flame:
        (i) flows into the first open end of the blank mold,
        (ii) extends through the blank mold, and
        (iii) leaves the blank mold through the second open end.

4. A blank mold sooting process as recited in claim 3, wherein:
    (a) the glass making apparatus includes a collar, a blow mold, and an invert and
    (b) said process further comprises a step of employing the invert to transfer the collar from the blank mold to the blow mold.

5. A blank mold sooting process for use on a glass making apparatus, said process comprising steps of:
    (a) depositing a lubricating/detaching layer:
        (i) on the internal walls of a blank mold which includes a first open end and a second open end at least substantially opposite the first open end
        (ii) by igniting an acetylene flow with electric resistance, thereby producing a flame, and
    (b) directing the ignited acetylene flow such that the flame:
        (i) flows into the first open end of the blank mold,
        (ii) extends through the blank mold, and
        (iii)cleaves the blank mold through the second open end.

6. A blank mold sooting process as recited in claim 5, wherein:
    (a) the glass making apparatus includes a collar, a blow mold, and an invert and
    (b) said process further comprises a step of employing the invert to transfer the collar from the blank mold to the blow mold.

7. A blank mold sooting process for use on a glass making apparatus, said process comprising steps of:
    (a) depositing a lubricating/detaching layer:
        (i) on the internal walls of a blank mold which includes a first open end and a second open end at least substantially opposite the first open end
        (ii) by igniting an acetylene flow having a flow rate with piezoelectric electrodes, thereby producing a flame;
    (b) directing the ignited acetylene flow such that the flame:
        (i) flows into the first open end of the blank mold,
        (ii) extends through the blank mold, and
        (iii) leaves the blank mold through the second open end; and
    (c) increasing the flow rate of the acetylene flow after the acetylene flow has been ignited.

8. A blank mold sooting process as recited in claim 7 wherein the blank mold has an interior and an exterior and further comprising steps of:
    (a) selectively moving a plunger between:
        (i) a first position wherein the plunger is positioned with respect to the blank mold such that the second open end is closed by the plunger and
        (ii) a second position wherein the plunger is spaced from the second open end of the blank mold such that the interior of the blank mold communicates with the exterior of the blank mold through the second open end of the blank mold and
    (b) moving the plunger to the second position during said step of depositing a lubricating/detaching layer.

9. A blank mold sooting process for use on a glass making apparatus, said process comprising steps of:

(a) depositing a lubricating/detaching layer:
   (i) on the internal walls of a blank mold which includes a first open end and a second open end at least substantially opposite the first open end
   (ii) by igniting an acetylene flow having a flow rate with a voltaic arc generator, thereby producing a flame;
(b) directing the ignited acetylene flow such that the flame:
   (i) flows into the first open end of the blank mold,
   (ii) extends through the blank mold, and
   (iii) leaves the blank mold through the second open end; and
(c) increasing the flow rate of the acetylene flow after the acetylene flow has been ignited.

10. A blank mold sooting process as recited in claim 9 wherein the blank mold has an interior and an exterior and further comprising steps of:
(a) selectively moving a plunger between:
   (i) a first position wherein the plunger is positioned with respect to the blank mold such that the second open end is closed by the plunger and
   (ii) a second position wherein the plunger is spaced from the second open end of the blank mold such that the interior of the blank mold communicates with the exterior of the blank mold through the second open end of the blank mold and
(b) moving the plunger to the second position during said step of depositing a lubricating/detaching layer.

11. A blank mold sooting process for use on a glass making apparatus, said process comprising steps of:

(a) depositing a lubricating/detaching layer:
   (i) on the internal walls of a blank mold which includes a first open end and a second open end at least substantially opposite the first open end
   (ii) by igniting an acetylene flow having a flow rate with electric resistance, thereby producing a flame;
(b) directing the ignited acetylene flow such that the flame:
   (i) flows into the first open end of the blank mold,
   (ii) extends through the blank mold, and
   (iii) leaves the blank mold through the second open end; and
(c) increasing the flow rate of the acetylene flow after the acetylene flow has been ignited.

12. A blank mold sooting process as recited in claim 11 wherein the blank mold has an interior and an exterior and further comprising steps of:
(a) selectively moving a plunger between:
   (i) a first position wherein the plunger is positioned with respect to the blank mold such that the second open end is closed by the plunger and
   (ii) a second position wherein the plunger is spaced from the second open end of the blank mold such that the interior of the blank mold communicates with the exterior of the blank mold through the second open end of the blank mold and
(b) moving the plunger to the second position during said step of depositing a lubricating/detaching layer.

* * * * *

UNITED STATES PATENT AND TRADEMARK OFFICE
CERTIFICATE OF CORRECTION

PATENT NO. : 5,958,099
DATED : September 28, 1999
INVENTOR(S) : Ambrogio MORETTIN It is certified that error appears in the above-identified patent and that said Letters Patent is hereby corrected as shown below:

Column 5, line 17, change "Settle air" to --Settled air--.

Signed and Sealed this

Twelfth Day of December, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,958,099
DATED : September 28, 1999
INVENTOR(S) : Ambrogio Morettin It is certified that error appears in the above-identified patent and that said Letters Patent is hereby corrected as shown below:

<u>Title page,</u>
Item [62] and Column 1, the Related U.S. Application Data is incorrect. It should read as follows:

-- Related U.S. Application Data

[62] Division of Application No. 08/688,772, July 31, 1996, Patent No. 5,746,800, which is a continuation of Application No. 08/207,704, March 9, 1994, abandoned. --

Signed and Sealed this

Eleventh Day of September, 2001

*Attest:*

NICHOLAS P. GODICI
*Attesting Officer*     *Acting Director of the United States Patent and Trademark Office*